United States Patent [19]

Donovan

[11] 4,302,496
[45] Nov. 24, 1981

[54] COMPOSITE WATERPROOF AND FLAME RESISTANT FABRICS

[75] Inventor: James G. Donovan, Norwell, Mass.

[73] Assignee: Albany International Corp., Albany, N.Y.

[21] Appl. No.: 199,270

[22] Filed: Oct. 21, 1980

[51] Int. Cl.³ .............................................. B32B 3/00
[52] U.S. Cl. .................................. 428/196; 428/198; 428/204; 428/246; 428/252; 428/304; 428/306; 428/322; 428/421; 428/913; 428/920
[58] Field of Search ............. 428/246, 247, 252, 304, 428/196, 198, 421,422, 913,920, 322, 306, 204

[56] References Cited

U.S. PATENT DOCUMENTS 3,953,566  4/1976  Gore ................................. 264/127
4,194,041  3/1980  Gore et al. ........................ 428/321

*Primary Examiner*—James J. Bell
*Attorney, Agent, or Firm*—Kenway & Jenney

[57] ABSTRACT

A composite waterproof fabric for tent walls and the like which is suitable for use under severe service conditions, and which is opaque, of light weight and flame or fire resistant. The fabric comprises at least three plies, namely outer and inner woven, flame resistant plies and a middle ply of polytetrafluoroethylene which is hydrophobic, microporous and moisture vapor permeable. Tensile strength and tear resistance are imparted to the composite fabric largely by the inner ply, and abrasion protection is imparted by the outer ply. A light weight fabric of this construction is opaque, color adaptable and flexible at very low ambient temperatures.

5 Claims, 1 Drawing Figure

COMPOSITE WATERPROOF AND FLAME RESISTANT FABRICS

BRIEF SUMMARY OF THE INVENTION

The Government has rights in this invention pursuant to Contract No. DAAK60-78-C-0088 awarded by the Department of the Army.

The present invention relates generally to materials in sheet form for tents and the like. More specifically, it relates to fabrics that are waterproof, yet permeable to mositure vapor such as that produced by perspiration and respiration of an occupant.

U.S. Pat. No. 3,953,566 described porous membranes comprising expanded polytetrafluoroethylene (PTFE). Such membranes and modified forms thereof are commercially available under the Trademark Gore-tex, sold by W. L. Gore & Associates, Inc. It is hydrophobic, microporous and permeable to gases. Thus water will not spread on the material and wick into its porous structure. This property prevents the penetration of water droplets, and for this reason the membrane is characterized as waterproof. On the other hand, water vapor is free to flow or diffuse as a gas through the membrane. This property is of great importance in applications where moisture and moisture vapor may adversely affect comfort, for example, as discussed in U.S. Pat. No. 4,194,041.

Although the above-described PTFE membranes have been shown to possess these desirable properties to a marked degree, they are incapable of providing other properties necessary for tent applications. Other major functional properties that are not adequately provided include adequate strength, that is, adequate tensile strength and tear resistance, and adequate fire resistance, also sometimes referred to herein as flame resistance.

It has been previously proposed, as in U.S. Pat. No. 4,194,041, to form a layered article by sewing or adhesively bonding together an outer layer of the expanded PTFE and an inner layer of a hydrophilic material, that is, a material which does not transfer water by capillary action or by wicking. However, this product is not flame or fire resistant. The patent also describes another embodiment in which the said two layers are combined with additional layers of nylon taffeta and nylon tricot knit, but such composites are also insufficiently resistant to fire and flame exposures.

The difficulties encountered in attempting to form composite fabrics that combine all of the desired properties are compounded by the fact that each additional layer of a selected material adds to the weight of the fabric, as preferably measured in ounces per square yard. It is an important object of this invention to provide a fabric that is not only strong, waterproof, permeable to water vapor and fire or flame resistant, but also one that has a relatively low weight per unit area.

Additional objects of the invention are to provide a fabric that exhibits such desirable properties as flexibility at low ambient temperatures, opacity and color adaptability. As used herein, opacity means that the fabric is not translucent as measured by placing a source of light on one side of the fabric and a photometer sensor on the other side to measure the light transmission through the fabric. This property is desirable for military uses. Color adaptability refers to the capability of the fabric to be pigmented or otherwise to receive a desired surface color, which is a capability of both military and nonmilitary value.

With the foregoing and other related objects in view, as hereinafter appearing, this invention comprises a light weight composite fabric consisting of at least three plies, lamina or layers. A middle ply is hydrophobic, yet porous and permeable to moisture vapor. This ply is affixed between outer and inner woven, flame-resistant plies each formed of a filamentary polymeric material having selected properties. The inner and outer plies comprise materials of differing chemical and physical properties, whereby the composite multi-ply material exhibits a novel and improved combination of properties including those properties previously discussed.

BRIEF DESCRIPTION OF THE DRAWING

The FIGURE depicts a preferred embodiment of the improved composite fabric of this invention, in schematic exploded form for purposes of explanation.

DETAILED DESCRIPTION

Figure 1:
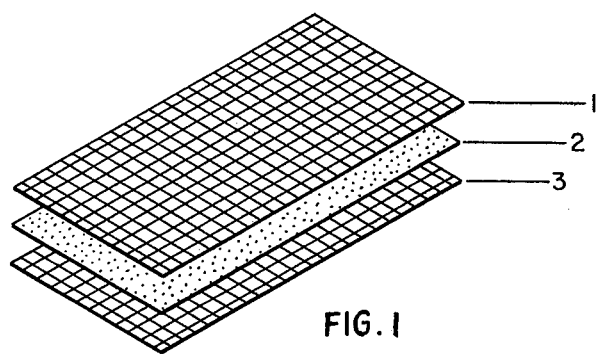

In the drawing the reference numeral 2 depicts a continuous middle ply of a hydrophobic, microporous, moisture vapor permeable material, such as the expanded polytetrafluoroethylene (PTFE) material described in said U.S. Pat. Nos. 3,953,566 and 4,194,041. This membrane is preferably fabricated to have a weight of 0.8 ounce per square yard but weights up to 1.2 ounces per square yard may be used in some applications. It has a moisture vapor transmission rate exceeding 1000 grams per square meter per day. It also possesses an advancing water contact angle exceeding 90°. These properties impart waterproofness and windproofness to the ply 2 but at the same time permit water vapor present on one side of the ply to flow or diffuse as a gas through the pores thereof to the other side.

However, the ply 2 has relatively insignificant tear strength and tensile strength. In fact, its strength in these modes is at least two orders of magnitude below the levels necessary for tent applications. Moreover, pigmented forms of the PTFE film or membrane are relatively flammable, and unpigmented forms are highly translucent.

Reference numeral 3 depicts an inner ply of flame resistant filamentary polymer in the form of a woven sheet. Preferably the ply 3 comprises woven multifilament yarns, preferably with balanced construction, that is, with equal strength in both warp and fill directions. The material of this ply is selected primarily for its tensile strength and tear resistance. The presently preferred material is a para-substituted polyaramide sold by Dupont under the Trademark Kevlar. Alternatively, any structurally similar copolymers may be used. For application as a tent wall material the fabric has a preferred weight per unit area of approximately 2.1 ounces per square yard, but weights up to 4.8 ounces per square yard may be used in some applications. As fabricated to have a weight of 2.1 ounces per square yard, it exhibits a tear strength of 93 pounds in the warp direction and 110 pounds in the fill direction. The tensile strength is 274 pounds per inch in the warp direction and 298 pounds per inch in the fill direction.

However, the Kevlar fabric has a yellow color and cannot be readily dyed; therefore its application as an exterior ply would not provide the desired color adaptability for some tent applications. Moreover, some evidence exists that Kevlar fabric has a relatively low resistance to prolonged weathering; accordingly, this ply preferably comprises the inner or interior surface of the composite fabric.

Reference numeral 1 refers to a woven outer ply of flame-resistant filamentary polymer. The presently preferred polymer for this ply comprises a meta-substituted polyaramide sold by Dupont under the Trademark Nomex. Alternatively, any structurally similar copolymer may be employed. This ply protects the inner elements from abrasion or weather-related degradation and is preferably woven using multifilament yarns which comprise approximately balanced construction in the warp and fill directions. This fabric has a preferred weight per unit area of approximately 2.5 ounces per square yard, although weights up to 4.8 ounces per square yard may be used in certain applications. The Nomex material is selected primarily for its fire and flame resistance, its ability to protect the middle ply from abrasion and its color adaptability. For example, it is available in a dark green color suitable for military applications. The Nomex ply somewhat increases the tear and tensile strength of the composite fabric. Measured separately from the other plies 2 and 3, the ply 1 at a weight of 2.5 ounces per square yard exhibits a tear strength of 14 pounds in each of the warp and fill directions, and a tensile strength of 103 pounds per inch in the warp direction and 94 pounds per inch in the fill direction.

The plies 1, 2 and 3 are preferably united as a unitary fabric structure by printing thereon a pattern of spaced dots or lines of urethane adhesive, for example an open diamond pattern, and then uniting the plies under sufficient pressure to assure a permanent bond. The adhesive dots or lines are sufficiently spaced to prevent the formation of a continuous layer of adhesive in the completed fabric, so that a relatively large percentage of the fabric surface is adhesive-free and therefore moisture vapor permeable.

EXAMPLE

An exemplary and preferred embodiment of the fabric according to this invention was formed as follows:
- Ply 1: Nomex, plain-woven, 2.5 ounces per square yard, dark green in color.
- Ply 2: Microporous Gore-tex PFTE film, 0.8 ounce per yard, blackened on one side.
- Ply 3: Kevlar, plain-woven, 2.1 ounces per square yard.

The above plies were united to form a unitary composite fabric by a pattern of spaced dots of a urethane adhesive of commercial grade.

This fabric exhibited properties that are very desirable in tents particularly tents intended for military or other severe service applications, that is, for continued rough usage and usage under severe weather conditions. The composite fabric weight of 5.4 ounces per square yard was approximately one-third the weight of tent wall material in contemporary military use.

The fabric was waterproof, having no measurable liquid water penetration at a hydrostatic pressure of 25 pounds per square inch.

The fabric was windproof, having an air permeability of less than one cubic foot per minute per square foot of surface area at an air pressure differential equivalent to 0.5 inch of water.

The fabric was permeable to water vapor, being capable of transmitting more than 300 grams per square meter in a twenty-four hour period.

The composite fabric was flexible to temperatures as low as $-50°$ F.

The composite fabric had a tear strength of 105 pounds in the warp direction and 101 pounds in the fill direction, with the warp and fill directions of the plies 1 and 3 mutually aligned. Also, the fabric had a tensile strength of 340 pounds per inch in the warp direction and 295 pounds per inch in the fill direction.

As noted above, opacity is a desirable property in certain applications. One of the limitations of the PTFE film comprising the ply 2 is that this ply is itself highly translucent. A measure of the translucence was obtained by the following apparatus. A plywood-light box was constructed and made light-tight except for a front panel or screen of translucent glass. A 75-watt incandescent lamp was mounted near the middle of the interior volume of the box and the interior walls were painted silver to increase internal reflection and to give diffused, uniform lighting of the translucent screen. A photometer sensor was rigidly mounted at a fixed distance from and at right angles to the translucent screen. With the room light out and the lightbox lighted, illumination at the photometer sensor surface was measured with each specimen in place over the lighted screen. At frequent intervals, illumination was measured without a specimen in place to obtain a reliable average base value. Results were reported as a percentage of light transmitted, given by 100 times the ratio of the illumination at the photometer with the specimen in place to the illumination at the photometer without the specimen in place.

Using this apparatus, white Gore-tex PTFE film transmitted 22.6 percent of the available light. It was further found that by application of suitable black pigmentation to one side of the Gore-tex PTFE film in such a manner as not to interfere materially with its moisture vapor transmission properties, it was possible to reduce the percent of available light transmitted to a small but detectable value of 0.3 percent. Each of the plies 1 and 3, when tested separately in a similar manner, transmitted a relatively small but detectable percentage of the impinging light. Nomex fabrics of darker colors transmitted less light than those of lighter colors.

It was further discovered that, upon the fabrication of the composite described in the above example, wherein one side of the Gore-tex PTFE film was pigmented black and the Nomex fabric 1 was of a dark green color, the percent of available light transmitted was reduced to a level that was substantially undetectable, rendering the fabric of substantially zero translucence. This desirable result appeared to depend upon the concurrence of pigmentation on both the PTFE film 2 and the woven outer layer 1, as well as upon the tightness of the weave in the layer 1.

This same exemplary composite fabric was also tested for flammability resistance, measured by vertical flammability tests made in compliance with Federal Test Standard No. 191, Method 5903.2 and the CPAI 84. These methods are essentially the same and are commonly used for tent materials. The following data were obtained in vertical flammability tests by these methods on four specimens of the exemplary fabric described above.

| Specimen Orientation (Warp or Fill Vertical) | After-Flame Time (Seconds) | Char Length (Inches) |
|---|---|---|
| Warp | 0 | 1.3 |
| Warp | 0 | 0.9 |

| Specimen Orientation (Warp or Fill Vertical) | After-Flame Time (Seconds) | Char Length (Inches) |
| --- | --- | --- |
| Fill | 0 | 0.8 |
| Fill | 0 | 0.9 |

The CPAI 84 tent wall and top flammability acceptance criteria allow the following maximum values for tent material in the weight range of the subject invention, with the stipulation that a specimen type that exceeds any one of these limits is not acceptable:
1. After-flame time (period in which a specimen continues to flame after removal of flame source) of 4.0 seconds for any individual specimen.
2. Average after-flame time for all specimens of 2.0 seconds.
3. Char length of 10.0 inches for any individual specimen.
4. Average char length for all specimens of 7.5 inches.
In terms of these criteria, the data shown for the preferred embodiment indicate a high level of flammability resistance.

The flammability resistance of each ply of the exemplary fabric was similarly and separately evaluated and it was shown that pigmentation of the PTFE film significantly reduced its relatively good flammability resistance. As shown in the above data, this did not hinder the fabrication of a highly flame-resistant composite.

I claim:
1. A composite fabric comprising, in combination
   a woven outer ply of flame resistant filamentary polymer selected from the group comprising meta-substituted polyaramide and copolymers thereof,
   a woven inner ply of flame resistant filamentary polymer selected from the group comprising para-substituted polyaramide and copolymers thereof, and
   a continuous middle ply bonded to the outer and inner plies and comprising a hydrophobic material having a moisture vapor transmission rate exceeding 1000 grams/m.$^2$/day and an advancing water contact angle exceeding 90 degrees.
2. The fabric of claim 1 in which the middle ply comprises a microporous sheet of polytetrafluoroethylene.
3. The fabric of claim 1 in which the middle ply is bonded to the outer and inner plies by an open pattern of adhesive dots.
4. The fabric of claim 1 in which the middle ply is darkly pigmented on a side thereof.
5. The fabric of claim 1 in which the outer and inner plies are plain woven.

* * * * *